United States Patent Office 2,821,273
Patented Jan. 28, 1958

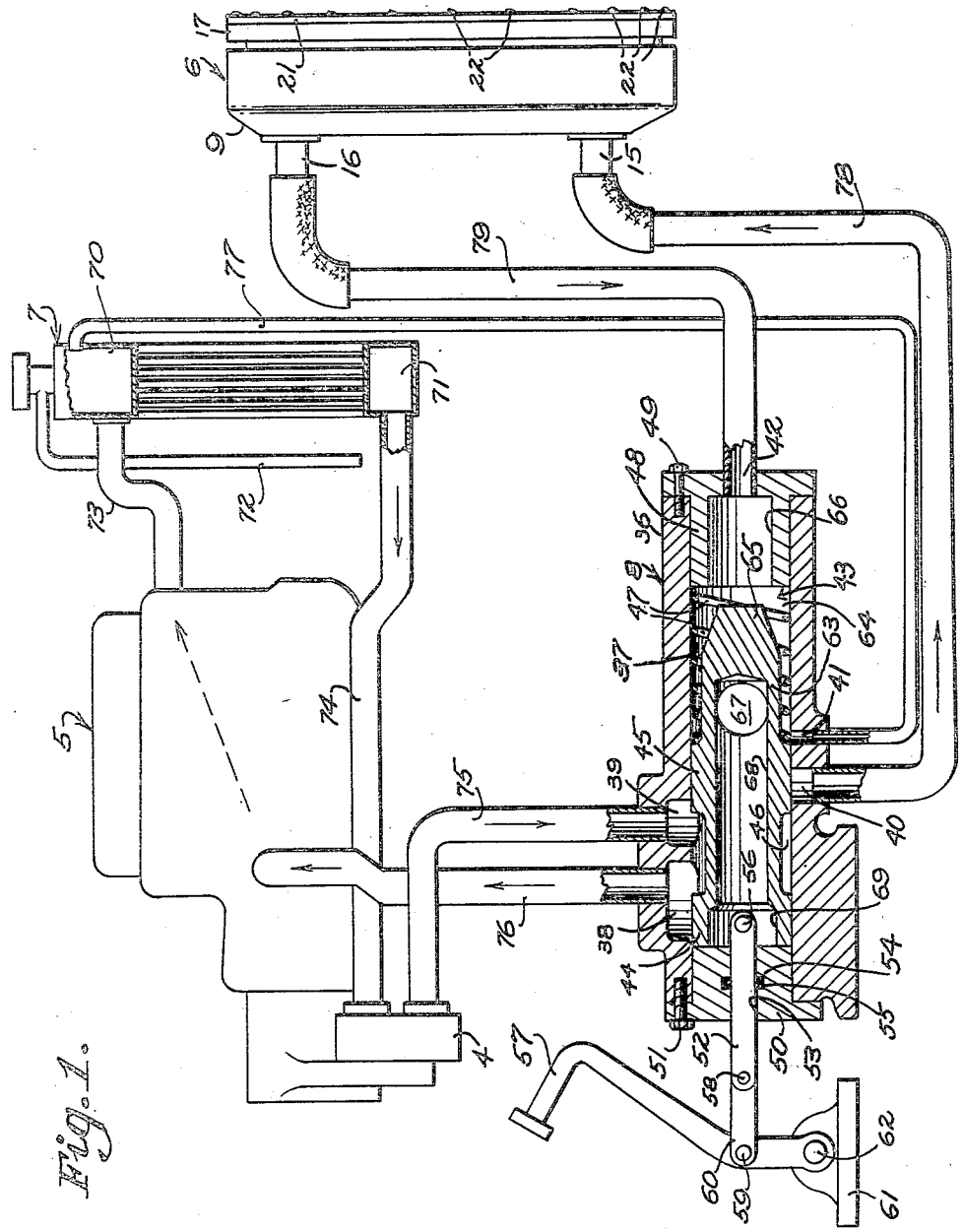

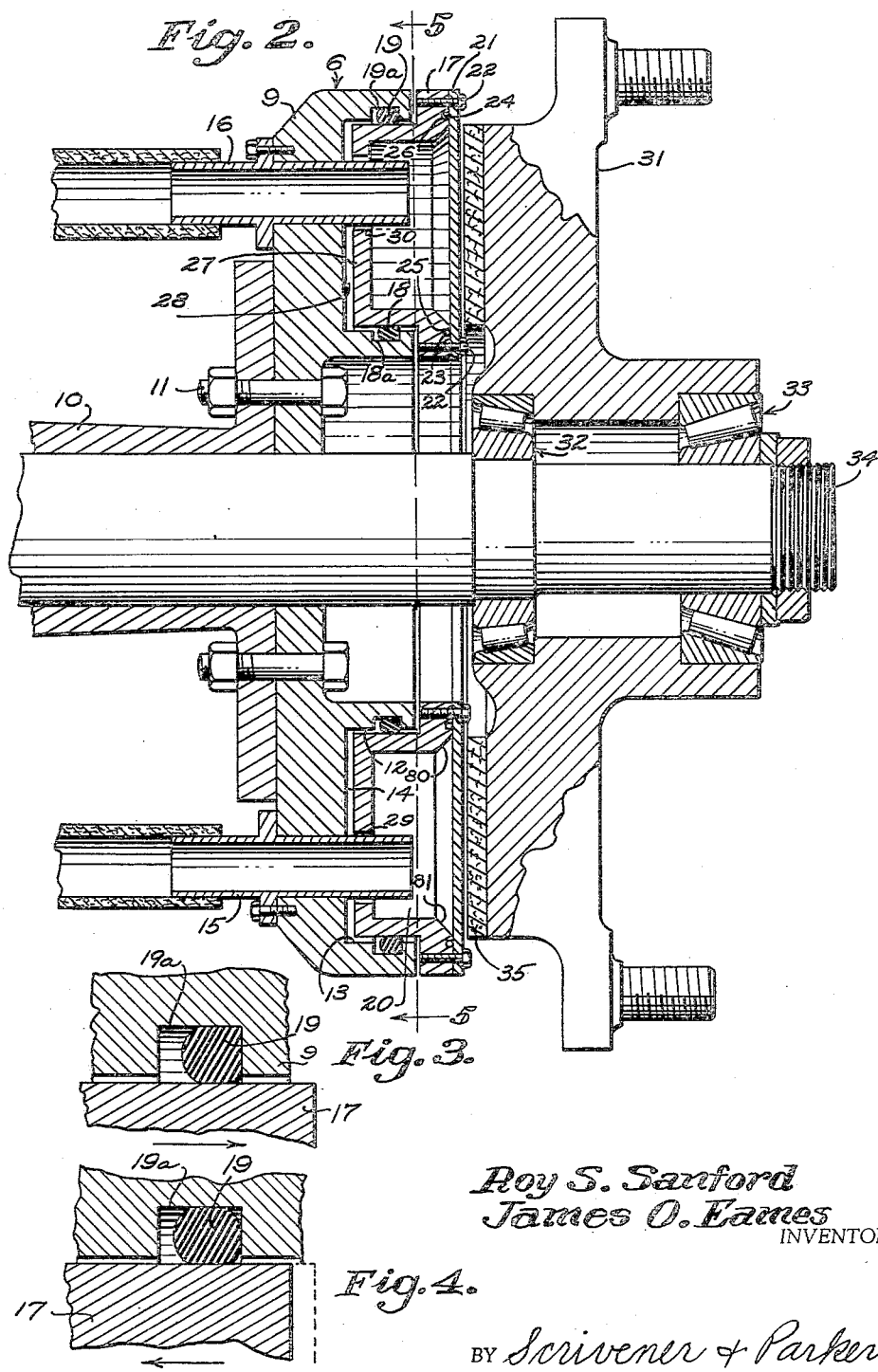

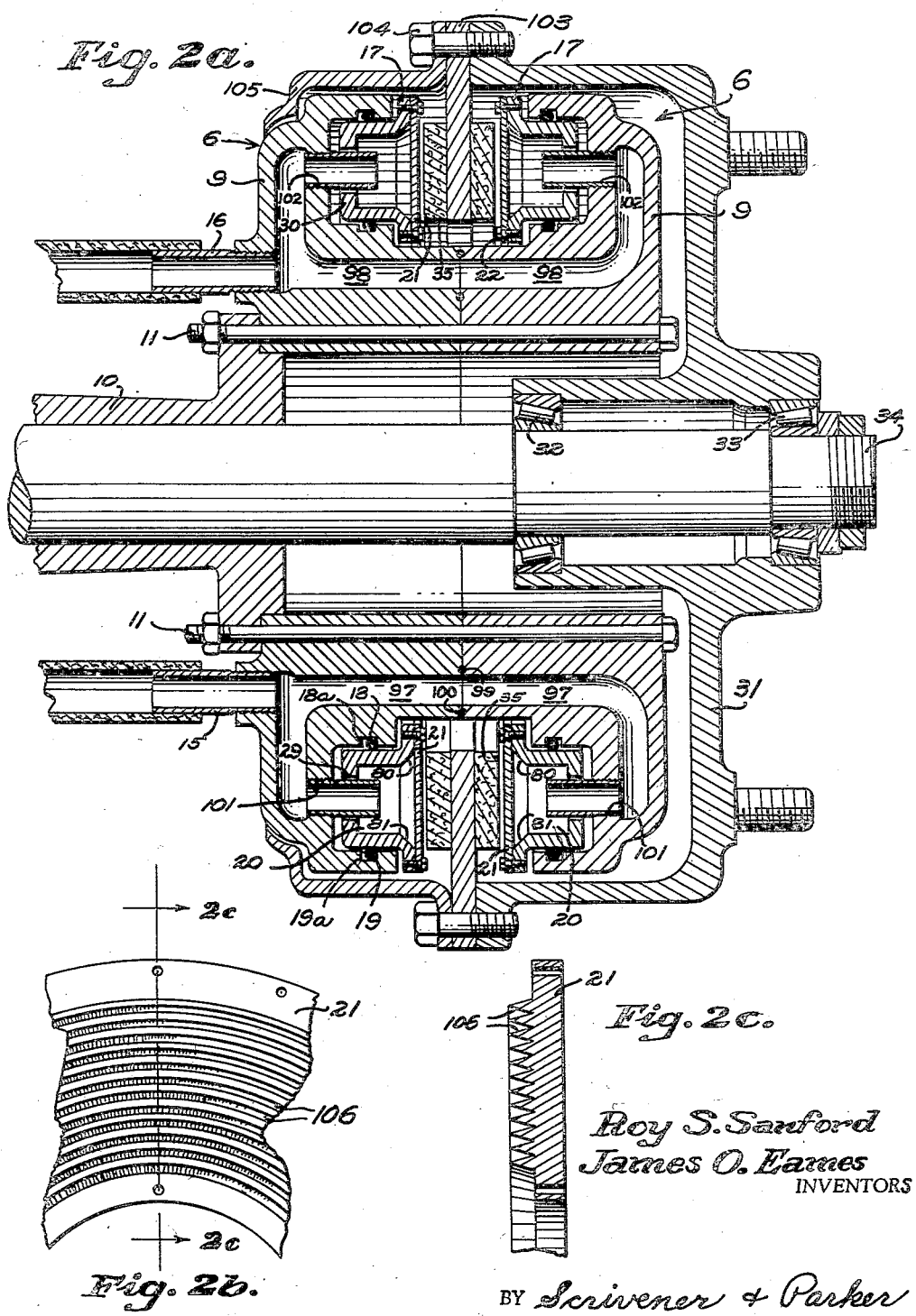

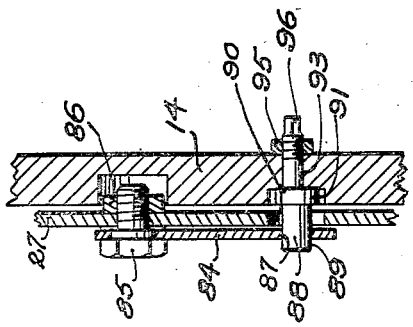
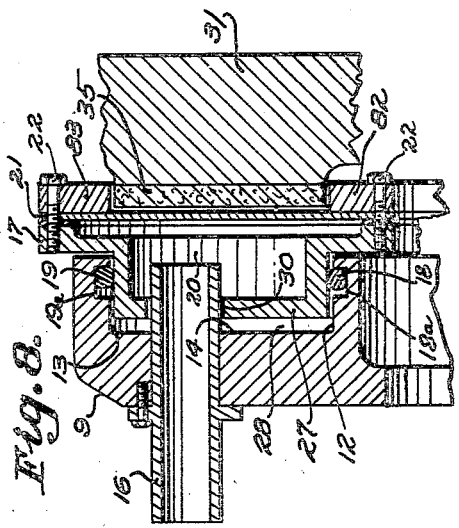
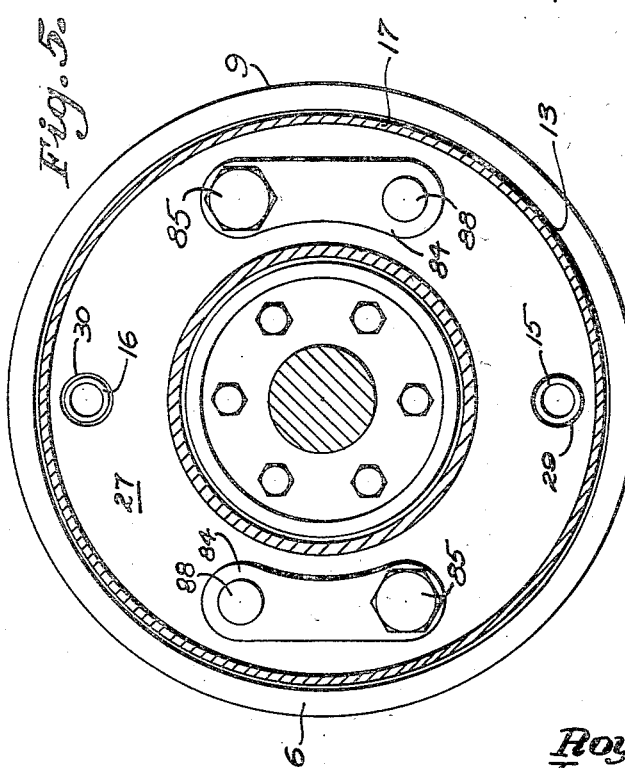
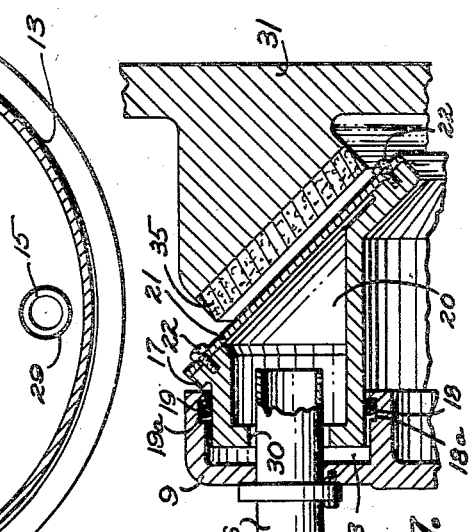

2,821,273

FLUID PRESSURE BRAKE SYSTEM

Roy S. Sanford and James O. Eames, Seymour, Conn., assignors to Roy S. Sanford, Woodbury, Roger H. Casler and James O. Eames, Washington, and Wilfred A. Eaton and Erling D. Sedergren, Woodbury, Conn.

Application December 14, 1954, Serial No. 475,072

24 Claims. (Cl. 188—264)

This invention relates to frictional mechanisms, hereinafter generally referred to as brake mechanisms, and more particularly to fluid pressure operated and fluid cooled mechanisms of this type.

The excessive heat developed during the operation of such mechanisms has caused difficulties in the past, and it is one of the objects of the invention to provide means for overcoming these difficulties.

Another object is the provision of novel brake cooling means.

Yet another object is the provision of novel frictional mechanism adapted for cooling by means of a circulating fluid.

Still another object is the provision of a novel brake actuator.

Another object is the provision of novel brake releasing means.

A further object is the provision of novel brake shoe positioning and mounting means.

Yet another object is the provision of means for preventing distortion of the brake friction elements.

A further object is the provision of means for effecting and maintaining uniform engagement between the brake friction elements.

A still further object is the provision of power operated brake mechanism.

Another object is the provision of automatic brake adjusting means.

Still another object is the provision of a novel brake friction element.

A further object is the provision of a novel method and means for supporting a brake friction element.

Yet another object is the provision of novel brake shoe torque transmitting means.

These and other objects of the invention will be more readily apparent from the following detailed description when taken in connection with the accompanying drawings. It is to be expressly understood, however, that the description and drawings are not to be taken as defining the limits of the invention, reference being had for this purpose to the appended claims.

In the drawings, Fig. 1 illustrates diagrammatically and partially in section, brake mechanism constructed in accordance with the principles of the invention.

Fig. 2 is a sectional view of one form of brake actuator mechanism;

Fig. 2a is a sectional view of another form of brake actuator mechanism;

Fig. 2b is a fragmentary plan view of a modification of one of the friction elements shown in Fig. 2;

Fig. 2c is a cross-sectional view of the friction element shown in Fig. 2b;

Fig. 3 is a partial sectional view of the brake adjusting and retracting mechanism with the brake in applied position;

Fig. 4 is a partial sectional view of the mechanism of Fig. 3 with the brake in release position;

Fig. 5 is a plan view, partially in section, of the brake shoe torque transmitting mechanism, taken along line 5—5 of Fig. 2;

Fig. 6 is a fragmentary sectional view of the mechanism of Fig. 5;

Fig. 7 is a fragmentary sectional view showing a modified form of brake actuator mechanism; and Fig. 8 is a fragmentary sectional view of still another form of brake actuator mechanism.

Fig. 1 includes in general an engine cooling pump 4 driven by a vehicle engine 5 in any suitable manner, not shown, a brake actuator 6, to be described more fully hereinafter, a cooling radiator or heat exchanger 7, and a pedal operated brake control valve 8. These elements are connected by suitable conduits, as will be set forth more fully in connection with the description of the system.

Referring now to Fig. 2, brake actuator 6 comprises an expansible chamber which includes an annular cylinder 9 secured against rotation to an axle housing 10 by means of bolts 11. The annular cylinder has inner and outer walls 12 and 13 concentric with the axis of the axle housing, the cylinder being open at the right end and closed at the left end by a wall 14 integral with the cylinder walls. Inlet and outlet conduits 15 and 16 are secured to the wall 14 and extend therethrough and into the interior of the cylinder as shown. A rigid annular piston 17, which may be made of suitable material such as cast iron, steel, plastic, or the like, is mounted in the cylinder for sliding movement axially thereof on a resilient sealing ring 18 positioned in groove 18a in the inner cylinder wall and a resilient sealing ring 19 positioned in groove 19a in the outer cylinder wall, the rings being compressed between the bottoms of the grooves and the corresponding piston walls in sliding frictional engagement with the latter and being of flexible, resilient rubbery material formed of a natural or synthetic rubber composition. The piston 17 has an open ended annular channel or chamber 20 for circulation of a cooling liquid, and the channel is closed at the right end by a separate, relatively thin, flat and flexible friction plate 21, of metal having a high heat conductivity and secured at its inner and outer peripheries to the end of the rigid piston as by means of cap screws 22, the piston and friction plate thus forming a movable brake shoe member or assembly. Thus the friction plate forms a part of the piston and moves bodily therewith, the mechanical force exerted by the piston being applied to the plate only on its inner and outer peripheral portions, and the plate itself being a pressure responsive member carried by the piston. This construction permits the braking torque to be transmitted from the thin friction plate to the rigid piston through the peripheral portions secured thereto as above described, and the torque is transmitted to the cylinder and axle housing by means to be described in detail hereinafter. Sealing rings 23 and 24 are disposed in grooves 25 and 26 in the right end of the piston and in sealing engagement with the friction plate. The piston has a back wall 27, which forms in connection with cylinder 9, an annular chamber 28. Enlarged apertures 29 and 30, through which conduits 15 and 16 pass, serve to connect piston channel 20 and chamber 28. The piston is prevented from rotating in the cylinder by suitable means, to be described hereinafter.

A wheel 31 is rotatably mounted by means of bearings 32 and 33 on an axle tube 34 carried by axle housing 10, the bearings serving to prevent movement of the wheel axially of the shaft in either direction. An annular friction ring 35 is adhesively or otherwise secured to the wheel for rotation therewith as shown, and positioned for engagement by the friction plate 21 on movement of the piston 17 to the right. The composition of the ring 35 is preferably such as to possess relatively low heat transfer qualities. In general, such compositions are composed of fibrous asbestos combined with conventional friction modifying and augmenting materials and a heat hardenable or curable organic binder material such as thermal setting resin, i. e., a phenol formaldehyde. Such compositions will be referred to hereinafter as composition friction materials.

Referring again to Fig. 1, brake valve 8 includes a casing 36 having a bore 37 extending therethrough. The casing is provided on its upper side with spaced ports 38 and 39, on its lower side with spaced ports 40 and 41, and at its right end with a port 42. A spool valve member 43 is slidably mounted in bore 37, and is provided with spaced lands 44 and 45 with a wide annular groove 46 therebetween. A return spring 47 is interposed between the right end of land 45 and the left face of a plug 48 carried in the right end of bore 37 and secured to the casing 36 by screws 49, and serves to normally maintain the left end of the valve member 43 in engagement with a plug 50 carried in the left end of the valve bore and secured to the casing by screws 51. A valve operating rod 52 is slidably mounted in a bore 53 in the latter plug, and is sealed by a sealing ring 54 carried in a groove 55 formed in the plug. The rod 52 is connected to the spool valve member 43 by a pin 56, and is connected to a brake pedal 57 by pins 58 and 59 and a link 60. The pedal is pivotally mounted on a suitable bracket 61 by a pin 62. The spool valve member 43 is provided with an elongated portion 63 of reduced diameter at the right of land 45, which forms, in connection with bore 37 and end plug 48, a chamber 64. The right end of member 43 has a tapered valve portion 65 adapted on movement to the right to enter and restrict the area of a port 66 in the end plug 48. Chamber 64 is connected to the valve bore at the left end of valve member 43 by a port 67 and passages 68 and 69 in the member.

The radiator 7 is provided with upper and lower tanks 70 and 71. The upper tank is vented to atmosphere by a conduit 72, and is connected to the upper part of the water jacket of engine 5 by a conduit 73. The lower radiator tank is connected to the suction side of the pump 4 by a conduit 74, the outlet side of the pump being connected to the valve port 39 by a conduit 75. The lower part of the engine water jacket is connected to valve port 38 by a conduit 76, and with the engine running and the valve parts in the position shown, the pump 4 draws liquid from the bottom of the radiator through conduit 74, and forces it into the top of the radiator through conduit 75, valve port 39, spool valve channel 46, port 38, conduit 76, engine 5, and conduit 73. The valve spool land 44 cuts off port 38 from passage 69 in the valve spool, which passage is connected to chamber 64 by passage 68 and port 67, and ports 38 and 39 are both cut off from port 40 by valve spool land 45. Consequently, valve ports 40 and 42, which are connected to the brake as will be hereinafter described, are isolated completely from the engine cooling system. In the event there is any leakage of cooling liquid past valve land 45 which would tend to build up pressure in valve chamber 64, this leakage liquid is vented to the upper radiator tank 70 through open port 41 and a vent conduit 77 connected to the upper tank. Since the tank is vented to atmosphere through conduit 72, the valve chamber 64 remains at substantially atmosphere pressure, and no appreciable pressure can be built up in conduits 78 and 79 which serve respectively to connect valve ports 40 and 42 with brake actuator inlet and outlet conduits 15 and 16.

In the event it is desired to apply the brake, the pedal is depressed to move the valve spool to the right. As the valve spool 43 moves, vent port 41 is closed by land 45, land 44 uncovers port 38 at the left side and starts to close it off at the right side, land 45 starts to uncover port 40, and thereafter tapered valve portion 65 acts to restrict port 66 at the right end of the valve.

During the first portion of the movement of the spool valve 43 to the right, the engine cooling liquid can still circulate directly from port 39 to port 38 through valve groove 46, and a portion of the liquid also circulates through the brake from port 39 through groove 46, port 40, conduits 78 and 15, conduits 16 and 79, port 42 and bore 66 into chamber 64 past tapered valve portion 65, and back to pump 4 through port 67, valve spool passages 68 and 69, port 38, conduit 76, engine 5, conduit 73, radiator 7, and conduit 74. The direct flow from port 39 to port 38 through groove 46 is restricted, however, as the valve spool moves to the right, causing more liquid to pass from port 39 to conduit 78 through groove 46 and port 40, and as the valve spool movement continues, tapered valve portion 65 acts to restrict the open end of bore 66 which receives the return flow of liquid from the brake through conduits 16 and 79 and valve port 42. Since the pump is preferably of the positive displacement type, at any given speed, the output of the pump is the same for that speed regardless of the valve spool position, but the pressures at different points in the system are determined by the restrictions in various parts of the system.

The restriction between ports 39 and 38 is increased as the restriction between ports 39 and 40 is decreased, causing more liquid to circulate through the brake system, and at the same time the bore 66 is restricted by the valve portion 65, thus increasing the pressure in the actuator and applying the brake with increasing pressure as the valve is moved further to the right. The return flow of liquid, however, is free to pass to the pump from chamber 64 through port 67, passages 68 and 69, port 38, conduit 76, engine 5, conduit 73, radiator 7, and conduit 74, the liquid passing through the brake actuator thus being cooled by the engine radiator. Although the pump 4 is shown as being driven by the engine, it will be understood that it can be driven by a constant speed electric motor or by any other suitable means. On release of the brake pedal, the brake actuator 6 is again cut off from the liquid circulating system and vented to atmosphere through conduit 77 and radiator vent conduit 72, permitting the brake to release. For a given pump speed, it will be understood that the amount of cooling and actuating liquid circulating through the brake actuator and the pressure of liquid therein will be determined by the position of valve spool 43 in the valve casing. From the foregoing, it will be apparent that the system described permits the use of the engine cooling system to circulate a cooling liquid through the brakes and to pressurize this liquid to apply the brakes. With the brakes released the liquid circulates through the vehicle engine and radiator only, while with the brakes applied, all or part of the liquid circulates through the brakes and through the vehicle engine and radiator.

As heretofore stated, one of the primary objects of the invention is the provision of a brake mechanism so constituted as to effectively dissipate the heat developed during braking, in order to minimize detrimental wear or decomposition of the mating friction elements. This is accomplished by the invention by subjecting the surface of the metallic friction element directly opposite the engaged friction surface of the composition friction material to the action of a circulating liquid, such as water, and generally referred to herein as a cooling liquid, and by providing for uniform engagement of the mating friction elements throughout the entire areas of the engaged surfaces thereof, so that the entire friction surface of the liquid cooled element is effective for heat dissipation, thus eliminating hot spots. This provides a direct transfer of heat through the metallic friction element 21, to the cooling liquid. The heated liquid is circulated through and cooled in a heat exchanger, and then recirculated through channel 20 to cool plate 21. The rate of heat transfer increases as the plate thickness is decreased, and consequently the cooling characteristics are materially improved by the use of a thin plate. Such plates, which are of metal of good heat conductivity, are preferably made separate from the piston 17, which latter may be of any suitable rigid and stable material. Maximum heat transfer is achieved by making the plates of thin metal. Since the plate 21 is secured to the rigid piston 17 and transmits the braking torque to said piston, it will be understood that the plate 21 must possess sufficient strength to transmit such torque to the piston. Moreover, since the plate 21 is relatively thin it possesses characteristics of flexibility and yieldability under the conditions of operation. Although, as will appear more fully hereinafter, the plate 21 is supported in operation so that no undesirable distortion or bending of the plate will result, the inherent flexibility of the plate enables the latter to more readily conform to the surface of the element 35 so that uniform engagement throughout the areas of contact will result to compensate for any minor non-parallelism between the friction elements 21 and 35. This latter feature insures that no localized areas of engagement will occur which would otherwise result in the development of hot spots and uneven and serious wear of the cooperating braking surfaces. It has been stated hereinbefore that the cooling liquid not only dissipates the heat developed during braking, but also acts upon the piston 17 to apply the brake. Since the plate 21 is in direct contact with the cooling liquid over an area opposite its braking surface, such area cannot be supported mechanically, as by means of the piston, but must be supported by other means. If properly controlled, the liquid in channel 20 may be used for this purpose, the pressure being so controlled in relation to the physical characteristics of plate 21 as to prevent undesirable distortion of the plate when forced against friction ring 35 by the piston 17.

Substantially pure copper, when properly cooled, has been found to be an outstanding friction material for the plate 21. The use of copper is highly desirable since this metal possesses a high coefficient of heat transmission. However, copper is a ductile metal and unless properly cooled and supported, distorts badly when subjected to the stresses resulting from braking. The present invention overcomes such difficulties and permits the use of a thin, flexible and yieldable plate of copper or other metal as a friction element, resulting in a brake with which successive brake applications can be made under the most severe conditions without fading and without overheating and consequent damage to the mating friction elements and other adjacent parts of the brake. As indicated heretofore, other metals may be utilized for the friction plate, and these include silver, which has a high coefficient of heat conductivity, as well as good friction characteristics when used against a composition friction material. Thin plates of silver, as well as those formed of any other suitable metal tend to distort badly when subjected to the stresses incurred in braking, unless arranged and supported in accordance with the principles of the invention.

Considering now the operation of the brake actuator, and referring particularly to Fig. 2, liquid enters the chamber 20 of annular piston 17 through conduit 15 and returns to the control valve through conduit 16. Since, in the embodiment shown, the restriction to the flow of cooling liquid from conduit 15 to conduit 16 through chamber 20 is slight compared to that imposed by the control valve, the pressure throughout chamber 20 will be substantially the same for a given control valve setting, and this pressure will also obtain in chamber 28, due to the fact that chambers 20 and 28 are connected by ports 29 and 30 in the rear piston wall. Since the piston is slidably mounted on sealing rings 18 and 19, the pressure in chamber 28 acting on the annular piston area between rings 18 and 19 will act to move the piston to the right to apply the brake, the pressure per square inch in chamber 28 will be substantially identical with that in channel 20 of the piston, and consequently the pressure per square inch on the piston will be the same as the pressure per square inch on plate 21.

The channel at the right end of the annular piston is enlarged as by means of inner and outer circumferential chamfered portions 80 and 81, so dimensionsed that the area of the open end of channel 20 is substantially the same as the effective area of piston 17 between rings 18 and 19. Since the end of the channel is closed by the relatively thin and flexible friction plate 21, the area of this plate exposed to the liquid in channel 20, hereinafter referred to as the unsupported portion, is substantially the same as the effective piston area, and the force exerted per unit area on such unsupported portion of the friction plate is the same as that exerted on the piston to move the piston and plate bodily to the right to engage the plate with friction ring 35 on the wheel. The friction ring, in the embodiment shown in Fig. 2, is so dimensioned as to engage the right surface of friction plate 21 on an area directly opposite the unsupported portion of the inner surface of the plate and the friction ring 35 has substantially the same area as the said unsupported inner surface. With such a construction, it will be readily seen that the entire area of frictional contact between the friction plate 21 and the friction ring 35 is subjected to the cooling action of the cooling liquid acting on the surface of the plate directly opposite thereto, when it is recalled that the entire area of the unsupported portion of the inner surface of plate 21, which is opposed to and substantially equal to the frictional engaging area of said plate, is in direct contact with the cooling liquid in chamber 20. It will also be seen that since the effective piston area and the area of the unsupported portion of the plate 21 are substantially the same, the forces acting on these areas, due to the pressure of the cooling liquid, are substantially the same. Thus, as the piston is moved outwardly, in response to fluid pressure in chamber 28, the peripheral portions of the plate 21 will be moved bodily by the cylindrical portion of the rigid piston, and the unsupported portion of the plate 21 will be supported by a fluid pressure force substantially equal to the force effective to move the piston. Since, as heretofore stated, the frictional area of the friction ring 35 is substantially the same as the area of the unsupported portion of the ring 21 and the piston 17, it will be readily understood that when the plate 21 contacts the friction disc 35, the opposing forces per unit area acting on the unsupported portion of the friction plate are substantially balanced and there is no tendency for the flexible plate 21 to distort in either direction due to the action of these forces. This construction permits the use of a relatively thin flexible plate having the ability to conduct heat very rapidly from the interface of plate 21 and friction ring 35 to the circulating liquid in channel 20. This arrangement is particularly advantageous in that it permits the plate 21 to be formed of a ductile and relatively weak material such as copper. Plates of substantially pure copper have been used in a brake of this construction with outstanding success, including plates of ⅛" and ³⁄₃₂" thickness. No appreciable distortion occurred in these copper plates, and the contact between the copper plate and the surface of friction ring 35 was substantially uniform due to the balance of forces maintained on opposite sides of the plate and due also to the aforementioned conformability of the thin plate 21. This was true even though the energy absorption per unit area was greatly in excess of that commonly used. In other words, since the thin plate 21 is flexible and is subjected to unit pressures due to the pressure of the cooling liquid acting uniformly on the entire left face thereof directly opposite the friction surface, the flexible plate will be forced into engagement with the friction ring so as to secure uniform contact throughout the entire cooperating areas of the ring and plate.

Friction plates having less thickness than that just indicated may be used, the only limitation as to thinness being that the plates must possess sufficient strength to transmit the braking torque to the piston 17 for the particular application. In fact, plates which are inherently non-rigid are definitely advantageous, since they conform more readily to the surface of friction ring 35.

The same principles apply to a cone type brake such as is illustrated in Fig. 7. In this embodiment, wherein parts similar to those of Fig. 2 are identified by the same reference numerals, friction ring 35 is cone-shaped as shown, friction plate 21 on the piston is correspondingly cone-shaped to mate with ring 35, and the right end of piston 17 is shaped to receive the plate, the latter being secured to the piston by screws 22. Here again, as in the case of Fig. 2, the friction plate 21 is separate from the rigid piston 17 and is thin, yieldable and flexible for the same reasons as in Fig. 2. The piston is slidably mounted in cylinder 9 and sealed by rings 18 and 19. Conduit 16, and conduit 15, not shown, connect channel 20 of the piston with the circulating liquid system as was the case in the structure illustrated in Fig. 2, and a chamber 28 is formed between the cylinder and piston and connected to channel 20 by port 30 and port 29, not shown. Thus it will be seen that the actuator operates in the same manner as the actuator in Fig. 2, an increase of pressure in chamber 28 serving to move the piston to the right to effect frictional engagement of friction plate 21 with friction ring 35 carried by wheel 31, and the liquid circulating through channel 20 serving to cool the plate 21. It will also be apparent that the operation of the actuator of Fig. 2 is identical to the operation of the actuator of Fig. 7, the only difference in construction being that in Fig. 2 the plate 21 is parallel to the left face of the piston 17 whereas in Fig. 7, these parts are angularly related.

As was the case in the structure of Fig. 2, the open end of channel 20 is so dimensioned that on engagement of a portion of the right surface of plate 21 with friction ring 35, a corresponding portion of the left surface of the plate directly opposite to the portion engaging ring 35 is exposed to the action of the cooling liquid in channel 20 and is unsupported except for the force exerted thereon by the liquid in the channel. In order to avoid distortion of the plate 21 due to its engagement with ring 35, it is desirable, as heretofore stated, that the mechanical force per unit area acting on the right surface of the plate normal thereto be substantially the same as the force per unit area exerted by the liquid in channel 20 normal to the corresponding left surface of the plate. To this end, the area of the annular piston is made substantially the same as the projected area of the annular opening of channel 20 at the right end of the piston, and in any case such that any force exerted on the right surface of the plate normal thereto is substantially balanced by a corresponding force exerted on the left surface of the plate normal thereto by the liquid in channel 20. In this embodiment, as was the case in the structure illustrated in Fig. 2, the ring 35 is preferably so dimensioned as to engage an outer portion of the plate 21 of substantially the same area as that of the unsupported left surface of the plate and directly opposite thereto, the entire left surface of the plate directly in line with the right surface engaged with ring 35 thus being in direct contact with the liquid in channel 20. An advantage of employing the cone type brake of Fig. 7 is that an increased braking area is secured as well as a corresponding increased area of the plate 21 which is subjected to the direct action of the cooling liquid, such advantage being secured without the necessity of correspondingly increasing the effective piston area.

Another modification of the brake actuator is illustrated in Fig. 8, wherein parts similar to those of Fig. 2 are identified by similar reference characters. The construction of this figure also includes an annular cylinder 9, and the piston 17 is slidably mounted therein and sealed by rings 18 and 19. The piston has a cooling liquid channel 20 and a relatively thin and flexible friction plate 21 secured to the right end thereof as will be more fully described. Channel 20 and chamber 28 are connected by port 30 and port 29, not shown, and conduit 16 and conduit 15, not shown, connect the actuator with the liquid system heretofore described, liquid being circulated through channel 20 in the same manner as in Fig. 2.

In the structures shown in Figs. 2 and 7, the construction has been such that the area of the piston and the projected areas of the open end of piston channel 20 and the friction ring 35, have been substantially the same. In Fig. 8, however, this is not the case, the area of the channel 20 at its open end being appreciably greater than that of the piston and of the friction ring 35, the total area of friction plate 21 being correspondingly greater as shown. In this figure, the friction plate is secured to the open end of the annular piston by inner and outer rigid annular clamping rings 82 and 83 fastened to the piston by bolts 22. The clamping rings are so dimensioned as to form an annular channel concentric with the piston and of substantially the same area as the latter, this channel being adapted, as shown, to receive the friction ring 35 with a slight clearance between the rings 82 and 83 and the friction ring. The ring 35, however, has substantially the same area as piston 17. Since that portion of the friction plate which is subjected to liquid pressure on one side, is effectively supported on the other side during a brake application by the annular clamping rings 82 and 83 and brake friction ring 35, it will be clear that the mechanical force per unit area acting on one side of the friction plate is substantially balanced by the liquid pressure force per unit area exerted on the other side. The area of the plate 21 subjected to the action of cooling liquid in channel 20 in this form of the invention, is much greater than that in frictional engagement with ring 35, resulting in greater transfer of heat to the cooling liquid, due to the radial flow of heat both inwardly and outwardly in the plate.

As stated heretofore, means are provided for preventing rotation of the piston in the cylinder due to the braking torque, and such means are illustrated in Figs. 5 and 6. A pair of oppositely disposed torque links 84 are pivotally mounted at one end as shown, on studs 85 parallel to the cylinder axis and secured to back wall 27 of piston 17 by nuts 86, the opposite ends of the links having bores 87 in sliding engagement with studs 88 secured to the end wall 14 of the cylinder parallel with studs 85, and having cylindrical portions 89 extending through enlarged bores 90 in the back piston wall 27. A collar 91 formed on the stud is housed within a recess formed in the rear wall of the cylinder, and a cylindrical portion 93 eccentric with respect to stud portion 89, extends through a bore in the wall 14 and is secured by a nut 95 as shown. A square portion 96 at the right end of the stud accommodates a wrench to permit turning of the stud when nut 95 is loosened. Since the stud portions 89 and 93 are eccentric to each other, the distance between the center lines of studs 85 and stud portions 89 can be readily adjusted so that on sliding movement of the piston in the cylinder, the links will be free to slide on stud portions 89. In the event it is desired to have the piston rock slightly about its axis as well as slide in the cylinder, as will be explained more fully hereinafter, the bores 87 may be made slightly larger than the diameters of stud portions 89, and the links may be slightly flexible if desired, so as to permit limited universal rocking movement of the piston relative to the axis of the cylinder as well as sliding movement in the cylinder, thus insuring more uniform engagement between friction plate 21 and friction ring 35 in the event the engaging face of the latter is disposed at a slight angle to the axis of rotation of the wheel.

Although the use of a circulating fluid for cooling and operating the brake has been referred to, it is preferable, for example, that a cooling liquid such as water or a mixture of water and ethylene glycol be used, in which case the pivotal and sliding connections of the torque links are immersed in the liquid and consequently lubricated thereby, thus facilitating the free movement of the piston in the cylinder during brake application and release.

As shown in Fig. 2, the piston can be arranged to float or rock in the cylinder by mounting it on the resilient sealing rings heretofore described, and so dimensioning the parts as to provide an appreciable clearance between the piston walls and the adjacent cylinder walls. The sealing rings 18 and 19 thus perform the dual function of providing a seal and a piston mounting which permits the piston to both rock in and move axially of the cylinder. This takes care of relative run-out of the friction disc 35 and the plate 21 due to normal manufacturing tolerances and insures smooth and efficient brake operation.

In addition to the foregoing, the sealing rings also function as brake shoe return springs and as automatic slack adjusters to maintain a predetermined clearance between friction plate 21 and friction ring 35 with the brake in released position, regardless of wear of the friction ring or the friction plate. Although the resilient rings shown are of the type known as O rings, these being initially cylindrical in cross-section and assuming a shape similar to that shown in Fig. 4 when the rings are compressed between the wall of the piston and the bottom of the groove in the cylinder wall, resilient rings of other cross-sectional shapes may be utilized, provided they are compressed between the relatively movable cylinder and piston members or other relatively movable members, are in sliding frictional engagement with one of the members, are restrained against appreciable movement bodily in at least one direction relative to the other of the members, as by means of grooves or other suitable means, and are installed so as to distort when a force is applied to one of the members to move it relative to the other and so as to spring back to substantially their original shape when the moving force is removed.

Figs. 3 and 4 illustrate the action of the sealing ring 19 during the braking operation, it being understood that the action of the sealing ring 18 is precisely the same. As shown, an O ring 19 is positioned in groove 19a in the wall of cylinder 9, and is compressed between the bottom wall of that groove and the wall of the piston 17, the ring being in sliding frictional engagement with the wall of piston 17, and the groove being so shaped relative to the ring that the latter can distort, as shown in Fig. 3, when the piston is moved to the right in cylinder 9. If the piston is moved by a mechanical force only, the friction force between the piston and ring will be the only force acting to distort the latter, and the ring will, on release of the mechanical force, spring back to its original shape, and the frictional engagement between the ring and piston will cause the latter to move back with the ring. On the other hand, if the piston is moved so as to first distort the ring and then slide through the ring as well, release of the mechanical force will cause the piston to retract through a distance determined by the amount of distortion of the ring, rather than the entire distance through which the piston was moved. Considering the piston and cylinder simply as a pair of relatively movable members moved by the application of mechanical forces only, the amount of retracting movement in one direction will always be that required to restore the ring to its original shape, regardless of the degree of initial movement in the other direction, thus resulting in not only an automatic return spring action but also in an automatic slack adjuster action which retracts the member a predetermined amount regardless of its stroke. This is true regardless of which member is moved relative to the other and regardless of which member is provided with the groove.

In the case of a fluid pressure actuator which comprises a cylinder and piston, however, the situation is different, and if any appreciable amount of fluid pressure is applied to the cylinder to move the piston, the ring groove must be so positioned that the ring distorting force due to the action of fluid pressure thereon acts in the same direction as the ring distorting force due to outward movement of the piston in the cylinder. In other words, as will be more fully explained below, the groove should be in the cylinder wall and the ring should be in sliding frictional engagement with the piston.

Assuming that the groove is in the cylinder as in Figs. 3 and 4, and that fluid under pressure is supplied to the cylinder to move the piston from the position shown in Fig. 4 to the position shown in Fig. 3, both the friction force of the piston on the ring, due to movement of the piston, and the pressure of the fluid on the ring, will tend to distort the latter to the right, somewhat as shown in Fig. 3. As the frictional force is slight, the distortion due to fluid pressure is, if any appreciable pressure is used, greater than that due to friction, and as a result the ring tends to distort to the right relative to the groove 19a. Regardless of the distance through which the piston 17 moves to bring the friction elements 21 and 35 into engagement, it will be clear that the area of frictional engagement between the piston 17 and ring 19 will be moved to the right relative to the groove 19a. On release of the pressure in the cylinder, the piston will retract therein only through a distance corresponding to the degree of distortion of the sealing ring, due to the frictional engagement between the ring and piston. The friction plate 21 is of course connected to the piston for positive movement therewith in either direction, and consequently is, on release of pressure from the cylinder, always returned to a predetermined distance from friction ring 35 determined by the degree of distortion of the resilient ring, regardless of the length of stroke required to initially effect engagement between the friction plate and friction ring. After the initial brake application following installation of the brake mechanism, there will be little if any sliding of the piston in the ring during subsequent applications until the brake elements wear. As such wear occurs, the piston will, on a following application, slide in the ring through a distance substantially corresponding to the degree of wear, and will be retracted through a distance determined by the distortion of the resilient ring, thus resulting in the automatic maintenance of a substantially fixed clearance at all times between the brake friction elements, and at the same time providing automatic release of the brake shoe without the use of return springs. Since the brake system is full of liquid at all times, the pressure in the actuator 6 will increase immediately on operation of the brake valve 8, and the time required to effect a desired degree of brake application will be the same regardless of the degree of brake wear, since the piston stroke will be substantially the same for each brake application, this of course being an essential feature of any automatic slack adjuster. Although this slack adjuster has been illustrated in connection with the liquid control and circulating system shown, it is equally applicable to an actuator operated by a conventional hydraulic master cylinder so constituted as to automatically maintain the cylinder full of liquid as the piston assumes new release positions in accordance with brake wear. It is immaterial, therefore, insofar as the operation of the slack adjuster is concerned, whether the piston of the actuator is operated by increasing the pressure of a circulating liquid or fluid in the cylinder as shown and described, or is operated by increasing the pressure of a non-circulating liquid in the cylinder, as may be done by connecting a conventional hydraulic brake master cylinder to conduit 16 and closing conduit 15 to prevent the escape of liquid therethrough from the cylinder.

In the event that the groove 19a is in the piston 17, the sealing ring 19 will, due to the action of the fluid pressure thereon, be distorted to the right and the area of frictional engagement between the cylinder wall and ring will be moved to the right relative to the groove. Consequently, on release of fluid pressure from the cylinder, it will be impossible for the ring to return to its original undistorted position. On the contrary, the tendency of the ring to return to its undistorted position tends to force the piston to the right to maintain frictonal contact between the frictional braking elements. Hence, the brakes will drag when fluid pressure is released. Since a dragging brake is highly undesirable, it will be clear that location of the sealing ring or rings in groove or grooves in the piston will not secure the advantageous results of the invention. It is also pointed out that in the event the parts are reversed, with the piston secured to the axle housing and the cylinder connected to the fricton plate 21 and sliding outward on the piston to apply the brake, it is still necessary that the ring grooves be located in the cylinder wall if the automatic slack adjuster feature is to operate as described.

The invention is also applicable to multiple disc brakes as well as to single disc brakes, and such a structure is illustrated in Fig. 2a, wherein a pair of actuators 6, similar to the actuator 6 of Fig. 2 are shown, these being so arranged that the thrust of the actuators in opposite directions axially of the wheel is balanced, and consequently no thrust is imposed on the wheel bearings in either direction due to the operation of the brakes.

In the embodiment of Fig. 2a, wherein parts similar to those of Fig. 2 are identified by the same reference numerals, opposed annular cylinders 9 are secured to axle housing 10 in opposed relationship by bolts 11, and have annular pistons 17 slidably mounted therein and sealed against leakage by sealing rings 18 and 19 mounted in grooves 18a and 19a in the cylinder walls. The cylinders are provided with lower and upper inlet and outlet passages 97 and 98 respectively, and with the cylinders assembled as shown, the lower and upper passages are in register, the junctions being sealed by sealing rings 99 and 100 as shown. Nipples 101 and 102 connect the passages 97 and 98 with channel 20 of the pistons, extending respectively through pressure equalizing ports 29 and 30 in the back walls 27 of the pistons. Inlet conduit 15 connects the passages 97 to inlet conduit 78, and outlet conduit 15 connects the passages 98 to outlet conduit 79. As was the case in Fig. 2, the outer ends of channels 20 are enlarged as by means of circumferential chamfered portions 80 and 81, so dimensioned that the areas of the open ends of the channels are the same as the corresponding piston areas. Relatively thin and flexible metal friction plates 21 are secured to the piston ends by screws 22 to form flexible end walls for the channels, and the annular portions exposed to the liquid in the channels and unsupported directly by the pistons have the same area as the pistons. An annular ring 103 is secured to the wheel for rotation therewith by bolts 104, these bolts also serving to secure a dust shield 105 to the wheel. Annuar composition friction rings 35 are secured to either side of ring 103 for rotation therewith, each being in alignment with the channel 20 in the adjacent piston and having substantially the same area as the open end of the channel.

When it is desired to apply the brake, a cooling liquid under pressure is circulated through the channels 20 as in Fig. 2, moving the pistons to engage plates 21 with friction rings 35. Since the friction rings and the open ends of the channels have the same area and are in alignment, and since the piston areas are the same as the corresponding channel and friction ring areas, the mechanical forces acting in one direction on the plates due to their engagement of the friction rings by the operation of the pistons are balanced by the fluid pressure forces acting in the other direction on the unsupported annular portions of the friction plates 21, and there is thus no tendency for the flexible friction plates to distort due to these forces, while at the same time the fact that they are flexible and are supported uniformly over the entire area directly in line with friction rings 35 permits them to conform more readily with the friction rings to insure uniform contact between the friction rings and plates. Also, the forces of the opposed pistons are balanced, and there is no tendency for the pistons to distort annular ring 103 or to apply an end thrust in either direction to the wheel bearings 32 and 33. As was the case in Fig. 2, the arrangement of the pistons in the cylinders and the arrangement of sealing rings 18 and 19 insures the desirable floating piston action, the automatic return spring action, and the automatic slack adjuster action. The braking torque of the piston is taken by anchor links as shown in Figs. 5 and 6. Although two brake actuators and two rotating friction discs have been shown, it will be apparent that additional discs may be utilized if desired.

Another novel and important feature of the invention resides in the modified form of friction plate 21 illustrated in Figs. 2b and 2c, wherein the annular portion of the plate subjected to the direct action of the cooling liquid in chamber 20 is provided with a plurality of grooves 106. These grooves may be concentric with the axis of the plate as shown, or may be spiral grooves as desired. Due to the film coefficient, which in this case is a measure of the rate of heat transfer per unit area from the back side of the plate to the cooling liquid, the heat is transferred through the metal friction plate much faster than it can be transferred from the plate to the cooling liquid. The provision of grooves in the back surface of the plate increases the area of the plate in contact with the liquid and thus minimizes the effect of the film coefficient and permits the plate to dissipate much more heat per unit area to the liquid than is the case when each unit of area of one side of the plate in engagement with friction ring 35 is equal to the corresponding unit of area on the other side of the plate in engagement with the cooling liquid.

In the interests of clarity, the thickness of the plate and the depth of the grooves shown in Fig. 2b and Fig. 2c is greater than is considered necessary, although such a groove arrangement could be utilized if desired. Plates were made, however, having an overall thickness of $3/32''$ and having adjacent concentric V-shaped grooves having an included angle between the sides of the grooves of $30°$ and a depth of $1/32''$, as well as plates having a $3/16''$ overall thickness and V-shaped grooves having a depth of $1/16''$ and an included angle of $30°$. With this arrangement, the area in engagement with the cooling liquid is approximately 3.8 times as great as that of a corresponding area on the outside of the plate in engagement with the friction ring, and a brake having these plates installed was found to have a much greater capacity for dissipating heat than the same brake having a smooth plate without the grooves. The increase in area on the back side of the plate, assuming that V-shaped grooves are utilized, is a function of the included angle rather than the depth of the grooves. Other groove forms may be utilized, or a large number of projections, provided they are so formed that the cooling liquid can contact substantially the entire grooved surface, and provided they are so shaped and arranged as to materially increase the area of the plate in engagement with the cooling liquid. The peripheral portions of the plate which engage the end of the piston are preferably left ungrooved. Although the grooves are shown as extending outwardly from the plane of the peripheral portions of the plate, it will be understood that the grooves may extend inwardly from that plane, and that the peripheral portions may be of any desired thickness, the requirement being that they be of sufficient thickness to permit the plate to be properly secured to the piston and that they have sufficient strength to transmit the braking torque to the piston. Although the depth of the grooves may be varied, they should be shallow enough to permit the circulating cooling liquid to make intimate contact with the grooves over substantially their entire surface. Repeated comparative dynamometer tests showed conclusively that a liquid cooled brake of the type heretofore described having a grooved friction plate 21, could dissipate at least four times as many B. t. u. per square inch per second as a conventional automotive brake without overheating and damaging the composition brake lining, and with less wear on the lining. This was the average heat dissipation for each stop, based on the total amount of energy required to be dissipated during the stop, and such stops were made repeatedly and in rapid succession without the occurrence of appreciable fade and without damage either to the metal friction plate or the composition friction ring.

It will be readily apparent from the foregoing description that a novel actuator has been provided, so constituted that a relatively thin flexible metallic brake friction plate of good heat conductivity may have one surface engaged with another friction element of relatively non-heat conducting character and be supported on the opposite surface by a fluid pressure force sufficient to prevent detrimental distortion of the metal plate. The inherent strength of the plate in resisting distortion may be taken into account, and if this strength is supplemented by fluid pressure on the back side of the friction plate sufficient to prevent detrimental distortion, the brake will operate satisfactorily. The control valve and system shown and described provides means for circulating a cooling fluid through the actuator and means for restricting the flow of fluid from the actuator to raise the pressure therein.

The friction plate may be constructed of various metals. Substantially pure copper has been found to be an outstanding material for this purpose, as it has unusually good friction and wear characteristics when cooled in the manner shown. Copper has little inherent strength against distortion, however, being ductile and flexible. Since efficient cooling of the friction plate requires exposure of the back surface opposite the friction surface to the cooling liquid, the copper plate opposite the braking surface is unsupported. The application of fluid under pressure to the back of the plate in accordance with the principles of the invention has been found to prevent distortion of the plate and to permit the use of ductile copper in thicknesses consistent with the structural properties heretofore mentioned. This arrangement also results in uniform contact of the friction plate and friction ring over their entire engaging surfaces. Although illustrated and described as applied to a disc type brake, the principles set forth are also applicable to other types of brakes, clutches and other friction elements.

The novel actuator may also be utilized in multiple disc brakes, as shown in Fig. 2a, this arrangement effectively preventing the application of any of the braking thrust to the wheel bearings. The brake mechanism can be completely sealed if desired to exclude dirt and water, since direct radiation from the brake structure is not relied on for heat dissipation.

The principles of the invention are also applicable to brakes of the shoe type, such as those having a plurality of hollow liquid cooled shoes arranged to move radially outward into frictional engagement with the interior surface of a brake drum when actuated by an expanding tube or other suitable means. The wall of the shoe which engages the drum may be a frictional element of thin flexible copper or other suitable metal supported at its periphery by the shoe structure and forming a wall of the cooling chamber in the shoe, and the circulating cooling liquid in the chamber may be pressurized as heretofore described in such a manner that the mechanical force tending to distort the friction element inwardly is substantially balanced by the fluid pressure force acting on the unsupported inner surface of the friction element.

The flexible friction plate, particularly when used in combination with the floating piston mounting, insures an unusually high degree of conformance between the mating friction surfaces of the metal friction plate and the composition friction ring, both of these features contributing to a uniform distribution of the braking load over the friction surfaces, and tending to compensate for wheel wobble which may occur as a result of wheel bearing looseness or inaccuracies in manufacture and assembly of the parts.

The foregoing desirable self-aligning action is facilitated by the floating anchor or torque link construction, which permits the piston to both slide and rock freely in the cylinder. The torque of the thin and flexible friction plate is transmitted to the rigid piston through its inner and outer peripheral portions, and consequently localized stresses which would tend to cause rupture of the plate are prevented. The piston, being of a rigid nature, provides an intermediate torque transmitting member, which is ideally suited for the transmission of the torque to the stationary cylinder and axle housing through the torque linkage described. The torque connections, which necessarily carry heavy loads, are, in the arrangement illustrated, immersed at all times in the cooling liquid and are lubricated thereby, thus greatly minimizing wear on the pivotal and sliding connections of the torque links.

In addition to acting as a seal and providing the desirable floating piston action, the resilient O rings eliminate the need for brake shoe return springs, and at the same time act as automatic slack adjusters to maintain a substantially constant clearance between the friction plate and the rotating friction ring. Although the friction ring has been shown as attached to a piston which slides in a cylinder attached to the axle housing, the same slack adjuster action will be had by attaching the friction plate to the cylinder and allowing it to slide on a piston attached to the axle housing, provided the sealing ring in either case is in sliding frictional engagement with the piston and held in the cylinder wall by a groove as shown.

The novel control system permits the use of the vehicle engine cooling system for circulating and pressurizing the cooling liquid in the brake actuator without requiring a larger vehicle radiator, since when the brakes are applied and the radiator is being utilized to cool the brakes, the heat which must be dissipated by the radiator due to the operation of the engine is relatively small. The system is so constituted that the entire output of the pump passes through the radiator regardless of the degree of brake application.

The heat dissipating capacity of a liquid cooled brake of the type described is dependent on a number of factors, including the conductivity of the metal of the friction plate, the thickness of the plate, the area of the liquid cooled surface of the plate relative to the friction area of the plate through which the braking heat is dissipated, and the film coefficient, which relates to the insulating effect of a very thin film of the cooling liquid directly adjacent the surface of the friction plate of a given thickness.

Assuming that the plate is made of copper, for example, that a given area on one surface of the copper plate is heated and that an equal area on the other surface of the plate directly opposite the first named area is subjected to the action of a circulating cooling liquid, the heat will, in the case of the thin plates which are utilized in accordance with the invention, go through the copper much faster than it can be imparted to the liquid by the copper. If another plate of half the thickness of the first named plate is used, the heat can reach the cooled surface of the plate twice as fast, but the rate at which heat will be transmitted from the braking surface and dissipated in the cooling liquid will not be increased in the same proportion as the decrease in thickness of the plate and consequently the benefit of the reduction in thickness of the plate is not obtained. Thus it is apparent that the insulating film of liquid is an important factor in determining the overall efficiency of the copper and circulating cooling liquid as a means for dissipating heat. If the area of the liquid cooled surface of the plate is increased in relation to that of the friction surface directly opposite thereto, more surface is provided in contact with the water without any appreciable change in the film coefficient, and within reasonable limits, the heat dissipating ability of the system is increased in substantially direct proportion to the increase in area. Grooves of the type shown in Figs. 2b and 2c provide an efficient method of obtaining this area increase, although grooves of other shapes may be used as well as a plurality of closely spaced projections, and metal forming the grooves or projections being of course integral with the friction plate. The above arrangement provides simple means for increasing the liquid cooled area of the plate relative to the area opposite thereto in engagement with the friction ring, and repeated comparative tests with grooved and ungrooved plates have shown conclusively that the heat dissipating capacity of a given brake can be greatly increased by the use of the grooved plate.

In the brake illustrated and described, the major portion of the braking heat is dissipated by the cooling liquid, the composition brake lining is not heated sufficiently to damage the lining, wear of the lining and friction plate is materially reduced, and brake fade, which is a common fault in other brakes, is practically eliminated. The brake lining is a heat insulator, and effectively prevents overheating of the wheel, bearings and tire by the action of the brakes.

It will also be apparent that regardless of the degree of movement of the piston in the cylinder, no change occurs in the cross-sectional area or flow capacity of the piston channel 20. Thus, in the case of Fig. 2a, wherein two identical pistons are shown, unequal wear of the brake lining discs 35 sufficient to cause one piston to be extended in its cylinder more than the other, will have no effect on the quantity of water circulated through the channels, and will not affect the pressure drop through the channels. Consequently, with a brake constructed as shown in Fig. 2a, or with two of these brakes or the brakes of Fig. 2 connected together properly for control by a single control valve, the flow of liquid through all the piston channels 20 will be substantially equal, and the pressures acting on the different pistons will be substantially equal. Hence, each metallic friction element will, regardless of the positions of the pistons in their respective cylinders, absorb substantially the same number of B. t. u. per square inch of friction surface, will effect the same degree of braking on the corresponding rotating member, and the cooling action of the liquid on each friction plate will be the same.

From the foregoing, it will be apparent that the invention is not limited to the specific forms illustrated and described, but may as well be embodied in other equivalent forms within the scope of the appended claims.

What is claimed is:

1. Disc brake mechanism including a support, a brake member mounted for rotation on the support, an annular friction ring mounted on the brake member concentric with the axis thereof, an annular cylinder element nonrotatably mounted on the support concentric with said axis, an annular piston element in the cylinder having its walls spaced from the cylinder walls and having an outer end portion adapted to engage said friction ring, means for sealing the space between the adjacent cylinder walls and piston walls and for supporting the piston for sliding movement axially of the cylinder and for limited rocking movement with respect to the axis thereof, said means including resilient sealing rings of rubbery material compressed between the cylinder and piston and in sliding frictional engagement with the walls of one of said elements, means for preventing rotation of the piston in the cylinder comprising torque connections connecting said piston and cylinder, said connections being so constituted and arranged as to permit said sliding movement of the piston in the cylinder and said limited rocking movement of the piston relative to the cylinder axis, and connection means for supplying fluid pressure to the cylinder to effect sliding movement of the piston in the cylinder and engagement of said outer end portion thereof with said friction ring on said brake member.

2. A friction shoe actuator including a cylinder, a connection for supplying fluid under pressure to the cylinder, a friction shoe comprising a piston in the cylinder and a friction element connected to the piston for movement therewith in either direction, and means for preventing leakage of fluid from the cylinder past the piston, for retracting the friction shoe on release of fluid pressure from the cylinder, and for adjusting the piston to new release positions in accordance with wear of the friction element, said means including a ring of resilient rubbery material compressed between the cylinder and piston wall and in sliding frictional engagement with the piston wall, and means for preventing sliding movement of said resilient ring along said cylinder wall during outward movement of the piston in the cylinder in response to the application of fluid under pressure thereto.

3. A friction shoe comprising an annular rigid piston having an annular channel for a cooling liquid at one end, inlet and outlet ports in the channel for connecting the latter with a source of circulating cooling liquid under pressure, a thin and flexible annular metal friction plate on the end of the piston having inner and outer annular peripheral portions in engagement with said piston and an intermediate annular portion unsupported by said piston, said friction plate having an inner surface portion directly opposite said annular unsupported outer surface portion exposed in said annular channel and closing the end of said channel, and rigid inner and outer clamping rings on the outer surface of said plate secured to the piston for clamping said inner and outer peripheral portions of said plate to the piston, said rings supporting the outer surface of the friction plate along its inner and outer peripheries and defining an annular unsupported outer surface portion of said plate of substantially the same area as said piston.

4. A fluid operated brake comprising a cylinder, a rigid piston in the cylinder and having a chamber formed therein, one end of said chamber being open and having an area substantially equal to the effective area of said piston, a thin and flexible metal plate secured to the open end of the piston for closing said end, a friction brake member, and means for circulating a liquid under pressure through said cylinder and chamber to cool said plate and move said rigid piston and plate bodily outwardly in said cylinder to bring the plate into engagement with the brake member, the area of said brake member being substantially equal to the area of the open end of the chamber and in alignment therewith.

5. A fluid operated brake comprising a stationary annular cylinder provided with annular grooves in the inner and outer walls thereof, a rigid annular piston in the cylinder having its walls spaced from the walls of said cylinder, annular resilient rings of rubbery material respectively positioned in said grooves and frictionally engaging the piston walls, said piston having an end wall provided with a pair of openings therein and the piston also having an annular chamber provided with an open end having an area substantially equal to the effective area of the piston, a thin and flexible annular copper plate having its inner and outer peripheral portions secured to said piston to close the open end of said annular chamber and providing an intermediate annular portion provided with a surface exposed in said chamber and having an area equal to the area of said open end, a rotatable annular friction brake disc positioned for direct engagement with the opposite surface of said copper plate, the area of engagement between said disc and plate being substantially equal to the area of said open end of the chamber and in alignment therewith, and means for moving said piston to bring said plate into direct frictional engagement with said disc and for supporting said plate against distortion while cooling said plate, comprising means for circulating a liquid under pressure through said cylinder chamber and through said openings and into direct contact with the surface of said plate exposed in said chamber.

6. Frictional mechanism including a support, an annular ring rotatably mounted on the support having an annular friction element secured to each side of the ring, a pair of annular cylinders mounted in opposed relationship on either side of said annular ring and secured to said support, an annular piston in each cylinder and an annular friction member secured to the outer end of each piston and adapted for engagement with an adjacent friction element on outward movement of said piston in its cylinder, the inner and outer piston walls being spaced from the adjacent cylinder walls, a connection for supplying fluid under pressure to the cylinders to move said pistons outwardly therein, means for sealing said pistons against leakage and for supporting them for simultaneous sliding and rocking movement in the cylinders comprising resilient sealing rings of rubbery material compressed between the inner and outer piston walls and the adjacent inner and outer cylinder walls, each ring being in sliding frictional engagement with one of the walls and secured against axial movement along the corresponding adjacent wall, and torque connections between said cylinders and pistons for preventing rotation of the latter in the cylinders, said torque connections being so constituted as to permit simultaneous sliding and rocking movement of the pistons in the cylinders.

7. Frictional mechanism including a support, an annular ring rotatably mounted on the support, having an annular composition friction element secured to each side of the ring, a pair of annular cylinders mounted in opposed relationship on either side of said annular ring and secured to said support, an annular piston slidably mounted in each cylinder having an annular channel at its outer end having an area at the open end thereof substantially equal to or greater than the area of said piston, the piston area being substantially the same as that of the corresponding annular friction element, a fluid connection between said channels and cylinders, inlet and outlet connections for connecting said channels and cylinders with a source of circulating cooling liquid, a thin and flexible annular metal friction element secured to the outer end of each piston in sealing engagement therewith and forming a flexible wall closing the end of said channel, the surface of each of said metal friction elements directly in line with the adjacent composition friction element and opposite the corresponding engaging surface being exposed in said channel and unsupported directly by the piston, and torque connecting means for preventing rotation of the pistons in their cylinders.

8. A friction plate for a liquid cooled brake comprising a thin flexible metal plate having a smooth friction surface portion on one side adapted to engage a friction element, and directly adjacent integral substantially V-shaped grooves formed on the other side of said plate directly opposite said smooth friction surface portion, said grooves being so shaped as to provide a surface area on the other side of the plate directly opposite said smooth friction area materially greater than that of said friction area.

9. An actuator for frictional mechanism including an annular rigid cylinder, an annular piston slidably mounted in said cylinder and forming in connection therewith an annular liquid chamber, said piston having an open ended annular channel having an enlarged portion at the outer end thereof having an area at the outer end substantially equal to or greater than that of said piston, a thin metal friction element secured to the outer end of said piston and closing the open end of said channel, inlet and outlet connections for supplying a circulating liquid to said channel and for discharging liquid therefrom, and means in said piston for connecting said liquid chamber and channel.

10. Actuating mechanism for a brake friction element including a cylinder element, a piston element slidably mounted therein, one of said second named elements having a connection with the brake friction element for movement therewith, means for supplying fluid under pressure to the cylinder element to effect relative movement between the piston and cylinder elements to advance the brake friction element, and means operable on release of fluid pressure from the cylinder element to retract the brake friction element and the element connected thereto a substantially predetermined distance, including a groove in the cylinder wall, and a sealing ring of resilient rubbery material interposed under compression between the bottom of the groove and the piston wall and in frictional sliding engagement with the latter, said ring being subjected at all times to the pressure of fluid in the cylinder.

11. Brake mechanism including a support, a brake member rotatably mounted on the support, an annular cylinder secured to the support, an annular friction ring secured to the brake member for rotation therewith having a friction area substantially equal to or greater than the area of said cylinder, a rigid piston slidably mounted in said cylinder having an open ended channel adjacent said friction ring and a back wall for said channel forming a chamber in said cylinder separated from said channel by said wall, a thin and flexible annular metal friction plate having inner and outer annular peripheral portions secured to and rigidly supported by said piston, said plate forming an end wall for said channel, the annular outer surface portion of said plate bounded by said peripheral portions being adapted for engagement with said friction ring over a projected area thereof substantially equal to the effective area of said piston in said cylinder and a corresponding area of the inner surface of said plate in alignment with said annular outer surface portion being exposed directly to the action of a circulating cooling liquid in said channel, means for preventing rotation of said piston in said cylinder, a conduit for connecting the channel with a source of circulating cooling liquid and a second conduit for discharging cooling liquid from the channel, said conduits being so positioned and arranged as to insure the circulation of cooling liquid in intimate engagement with the entire surface of said plate exposed in said channel, and a port in said piston connecting said channel and chamber for equalizing the pressures therein.

12. A brake shoe assembly for a disc brake comprising a rigid annular piston adapted to be slidably mounted in a cylinder and having an annular channel for cooling liquid therein open at one end, said piston having a back wall closing the other end of said channel, ports in said piston for supplying cooling liquid to said channel and discharging cooling liquid therefrom, an annular metal friction plate positioned on the end of said piston having inner and outer annular peripheral portions in engaging relationship with the end of said piston and forming an end wall for said channel, and securing means for maintaining said peripheral plate portions in engagement with said piston and preventing distortion of said portions outwardly of said channel in response to the pressure of cooling liquid in said channel, said peripheral portions of the plate bounding a friction area on the outer surface of said plate, a projection of said friction area on a plane perpendicular to the axis of said piston having an area substantially equal to the area of said piston, and the open end of said channel being so dimensioned and arranged as to expose substantially the entire inner surface of the plate directly opposite said friction area on the outer surface to the action of a cooling liquid in said channel.

13. Liquid cooled and liquid pressure operated brake mechanism including a support, a brake member rotatably mounted on the support, an annular friction ring secured to the brake member for rotation therewith, an annular cylinder secured to the support, a rigid annular piston slidably mounted in the cylinder having an open ended channel at the outer end and a back wall forming, in connection with the cylinder, a chamber for liquid, port means adapted to connect said chamber and channel with a source of circulating cooling liquid and to discharge cooling liquid from said channel, said port means being so constituted as to insure substantially equal liquid pressures in said chamber and channel, a thin and flexible annular metal friction plate positioned on the outer end of said piston forming an end wall for said channel and having annular inner and outer peripheral portions in engaging relationship with said outer end of the piston, and securing means for maintaining said peripheral plate portions in said engaging relationship with the piston and for preventing distortion thereof outwardly of said piston channel in response to the pressure of liquid in said channel, said peripheral portions of said plate bounding an annular friction area on the outer surface of the plate having a projected area axially of the cylinder substantially equal to the area of said piston and to the projected area of said friction ring axially of the cylinder, and the open end of said channel being constructed and arranged as to expose substantially the entire area of said plate on the inner surface thereof directly opposite to said annular friction area on the outer surface of the plate to the action of cooling liquid in said channel.

14. A frictional mechanism including a pair of relatively rotatable supports, a friction element secured to one of the supports, a friction shoe including a rigid body portion mounted on the other of said supports for movement toward and away from said friction element, said body portion having a fluid chamber therein and a flexible metal friction element secured thereto forming one wall of said chamber, the portion of the inner surface of said flexible element in line with said first named friction element being exposed in said chamber, actuating means for moving said shoe bodily toward said first named element to effect engagement of the two friction elements, means for supplying fluid under pressure to said chamber at a pressure sufficient to support said flexible friction element and prevent yielding of said element inwardly due to engagement thereof with the first named friction element, and means for maintaining the pressure of fluid in said chamber substantially proportional to the friction element engaging force exerted by said actuating means.

15. A friction shoe comprising an annular rigid piston having an annular channel for cooling liquid open at one end and having a back wall at the other end closing said other end, spaced ports in said back wall for circulating cooling liquid under pressure through said channel and for discharging liquid therefrom, said channel having an enlarged portion at said open end, a thin and flexible annular metal plate having a high coefficient of heat conductivity secured to and supported along its inner and outer peripheries by the piston and having an annular portion of the inner surface thereof exposed in said channel, the effective area of the piston being substantially equal to or less than the projected area of said annular inner surface portion.

16. A friction shoe comprising an annular rigid piston having an annular channel for cooling liquid open at one end, connections for circulating cooling liquid under pressure through said channel, and a thin and flexible annular metal plate secured to and supported along its inner and outer peripheries by the piston and having an annular portion of the inner surface thereof exposed in said channel, said annular metal plate being cone-shaped and the piston being correspondingly shaped to support the peripheral portions of the plate, and the area of the piston being substantially the same as or less than the projected area of said annular inner surface portion of the plate projected in a plane perpendicular to the axis of the annular piston.

17. Frictional mechanism including a rigid pressure responsive member having a liquid chamber therein, said member including a back wall closing one end of the chamber, the other end of the chamber being open and having an enlarged portion at said other end, a flexible metal friction plate secured to the pressure responsive member and closing said other end of said chamber with the major portion of said plate exposed in said chamber, said exposed portion of said plate having an area substantially equal to or greater than the effective area of said pressure responsive member, means for subjecting the pressure responsive member to fluid under pressure to effect bodily movement of the member and plate to engage the outer surface of the plate with an adjacent friction element, and means including spaced ports in said back wall for supplying a circulating cooling liquid to the chamber at substantially the same pressure as that to which the pressure responsive member is subjected and for discharging said cooling liquid from said chamber.

18. Frictional mechanism including a rigid pressure responsive member having a liquid chamber therein, a flexible metal friction plate secured to the pressure responsive member and forming one wall of said chamber with the major portion of said plate exposed in said chamber, said exposed portion of said plate having an area substantially equal to or greater than the effective area of said pressure responsive member, means for subjecting the pressure responsive member to fluid under pressure to effect bodily movement of the member and plate to engage the outer surface of the plate with an adjacent friction element, means for supplying a circulating cooling liquid to the chamber at substantially the same pressure as that to which the pressure responsive member is subjected, and a connection for discharging said circulating cooling liquid from said chamber, the areas of the pressure responsive member and the opposite areas of the plate respectively exposed in the chamber and engaged with said friction element being proportioned so that the opposed unit area forces acting on the last two named areas normal to the surface of the plate are substantially balanced.

19. A friction shoe comprising an annular rigid piston having an annular channel for cooling liquid open at one end, connections for circulating cooling liquid under pressure through said channel, and a thin and flexible annular metal plate secured to and supported along its inner and outer peripheries by the piston and having an annular portion of the inner surface thereof exposed in said channel, the effective area of the piston being substantially equal to or less than the projected area of said annular inner surface portion, the metal plate including copper and having a high coefficient of heat conductivity.

20. A friction shoe comprising an annular rigid piston having an annular channel for cooling liquid open at one end, connections for circulating cooling liquid under pressure through said channel, and a thin and flexible annular metal plate secured to and supported along its inner and outer peripheries by the piston and having an annular portion of the inner surface thereof exposed in said channel, the effective area of the piston being substantially equal to or less than the projected area of said annular inner surface portion, the metal plate including silver and having a high coefficient of heat conductivity.

21. A liquid-cooled friction shoe for a disc brake comprising a rigid annular piston having an annular channel for cooling liquid formed therein open at one end of the piston and a back wall at the other end of the piston closing the channel at said other end of the piston, an annular metal plate having a smooth outer friction surface formed thereon secured to said one end of the piston along the inner and outer peripheral portions of the plate and having an inner annular surface portion between said peripheral portions and directly opposite said friction surface exposed in said channel, said metal plate including copper and having a high coefficient of heat conductivity, and spaced inlet and outlet ports in said back wall for respectively supplying cooling liquid to said channel and for discharging cooling liquid therefrom.

22. A liquid-cooled friction shoe for a disc brake as set forth in claim 21, wherein directly adjacent integral substantially V-shaped grooves are formed on the inner annular surface portion of said plate exposed in said channel, said grooves being so shaped as to provide an exposed area on said inner annular surface portion of the plate materially greater than that of said smooth outer surface of said plate directly opposite said inner surface portion.

23. An actuator and friction shoe assembly for a liquid cooled frictional mechanism including an annular cylinder open at one end and having an end wall closing the other end, a rigid annular piston slidably mounted in said cylinder, said piston having an annular channel for cooling liquid formed therein open at the outer end of the piston, the inner end of said piston having a back wall closing the inner end of said channel, said cylinder end wall and piston back wall forming a chamber therebetween separated from said channel, an annular metal friction element secured to the outer end of the piston, the outer surface of the element having a smooth friction surface formed thereon and substantially the entire inner surface of said element directly opposite said friction surface being exposed in said channel, and means for supplying a cooling liquid to said channel and for discharging cooling liquid therefrom including an inlet port in one of said walls, a corresponding inlet conduit secured to the other of said walls and extending into said inlet port, and an outlet port in one of said walls and a corresponding outlet conduit secured to the other of said walls and extending into said outlet port, said conduits extending through said chamber formed between said walls.

24. Liquid cooled and fluid pressure operated brake mechanism including an annular cylinder open at one end and having a wall closing the other end thereof, an annular composition friction ring having relatively low heat transfer qualities spaced from the open end of the cylinder and mounted for rotation concentric with the axis of the cylinder, a rigid annular piston slidably mounted in the cylinder having an annular channel for cooling liquid formed therein open at the outer end of the piston and having a back wall at the other end closing the channel at said other end, said walls forming an expansible fluid chamber therebetween separated from said channel, said piston being movable toward said friction ring in response to the supplying of fluid under pressure to said chamber, an annular metal friction element having a high coefficient of heat conductivity secured along the inner and outer peripheral portions thereof to said one end of the piston and closing said channel, the outer surface of said element having a smooth annular friction surface formed thereon, engageable with said friction ring and substantially the entire inner surface of the element directly opposite said annular friction surface being exposed in said chamber, and means for supplying cooling liquid to said channel in said piston and for discharging cooling liquid therefrom including an inlet port in one of said walls, a corresponding inlet conduit secured to the other of said walls and having one end extending into said inlet port, and an outlet port in one of said walls and a corresponding outlet conduit secured to the other of said walls and having one end extending into said outlet port, said conduits extending through said chamber formed between said walls.

References Cited in the file of this patent

UNITED STATES PATENTS

| | | |
|---|---|---|
| 464,949 | Alden | Dec. 15, 1891 |
| 1,482,661 | Scruby et al. | Feb. 5, 1924 |
| 1,855,636 | Ketchum | Apr. 26, 1932 |
| 2,051,286 | Boykin | Aug. 18, 1936 |
| 2,111,335 | Sanford | Mar. 15, 1938 |
| 2,152,489 | Lamb | Mar. 28, 1939 |
| 2,358,740 | Scott-Iversen | Sept. 19, 1944 |
| 2,406,304 | Levy | Aug. 20, 1946 |
| 2,621,769 | Cardwell et al. | Dec. 16, 1952 |
| 2,664,176 | Whalen | Dec. 29, 1953 |

FOREIGN PATENTS

| | | |
|---|---|---|
| 477,510 | Great Britain | Dec. 31, 1937 |
| 653,565 | Great Britain | May 16, 1951 |